United States Patent [19]

Cuny et al.

[11] Patent Number: 5,442,658
[45] Date of Patent: Aug. 15, 1995

[54] SYNCHRONIZATION APPARATUS FOR A SYNCHRONOUS DATA PROCESSING SYSTEM

[75] Inventors: Philippe Cuny, La Gaude; Oliver Maurel, Le Cannet; Philippe Klein, Cagnes-Sur-Mer, all of France

[73] Assignee: International Business Machines Corporation, Armonk, N.Y.

[21] Appl. No.: 117,267

[22] Filed: Sep. 7, 1993

[51] Int. Cl.⁶ ............................................. H04L 7/00
[52] U.S. Cl. .................................. 375/356; 375/362; 370/100.1
[58] Field of Search .......... 375/106, 107, 108, 111356, 375/354, 357, 362; 370/85.1, 85.11, 100.1, 105, 105.13, 105.5

[56] References Cited

U.S. PATENT DOCUMENTS 3,778,549 12/1973 Schroder et al. ................... 178/68
4,229,816 10/1980 Breidenstein et al. .......... 370/100.1

FOREIGN PATENT DOCUMENTS 0344736 5/1989 European Pat. Off. ...... G06F 13/42
0352081 7/1989 European Pat. Off. ...... G06F 13/42
0409230 7/1990 European Pat. Off. ........ H04J 3/06

OTHER PUBLICATIONS

IBM Technical Disclosure Bulletin, vol. 34, No. 11, 1 Apr. 1992, New York US, pp. 92–93, Nomen Nescio. "Pseudo Asynchronous Bus Interface".

Primary Examiner—Stephen Chin
Assistant Examiner—William Luther
Attorney, Agent, or Firm—John J. Timar

[57] ABSTRACT

Synchronization apparatus in interconnected units of a data processing system resynchronize received bits from a bus with the internal clock of the unit. The synchronization arrangement has two identical synchronization devices which alternately process received strobe pulses which are used for sampling data bits into a first register, generating a gating pulse on one output and a validation pulse on a second output. In response to the gating pulse, bits stored in the first register are transferred to a second register to be available for use by processing logic in synchronism with the internal clock signal. The synchronization devices include two parallel synchronization circuits operating in opposite phase so that the detection of one strobe pulse by one circuit automatically disables the other one.

7 Claims, 6 Drawing Sheets

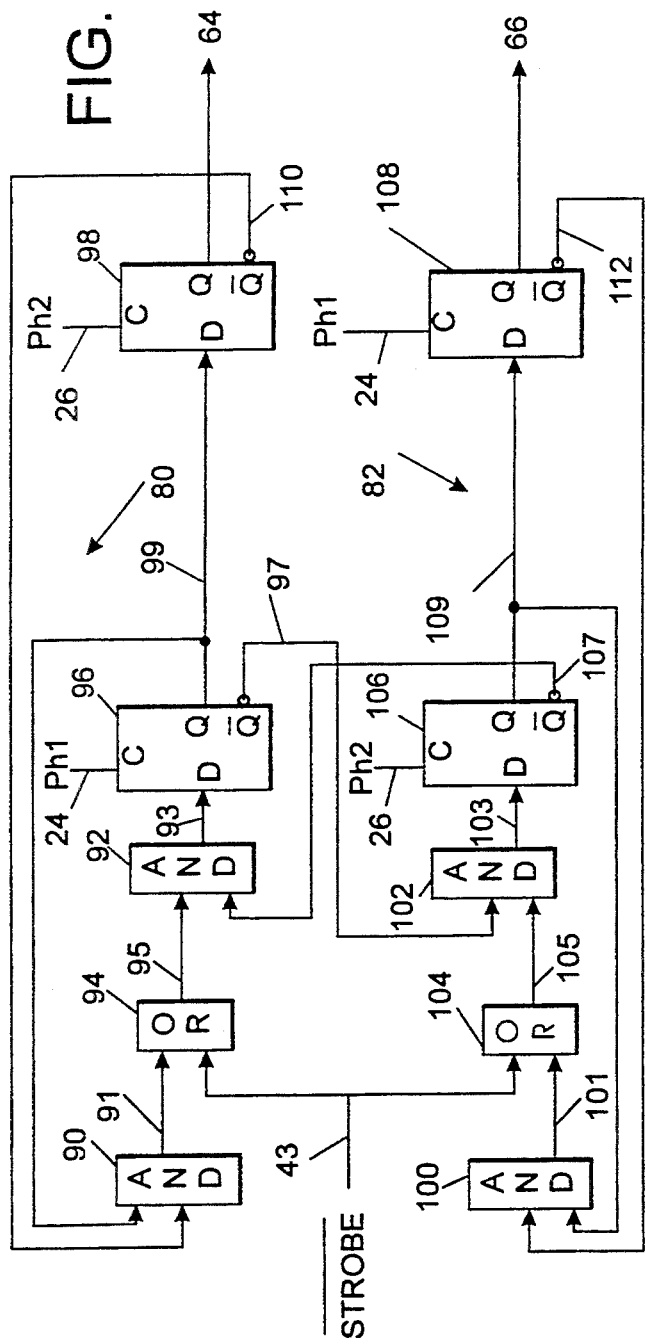
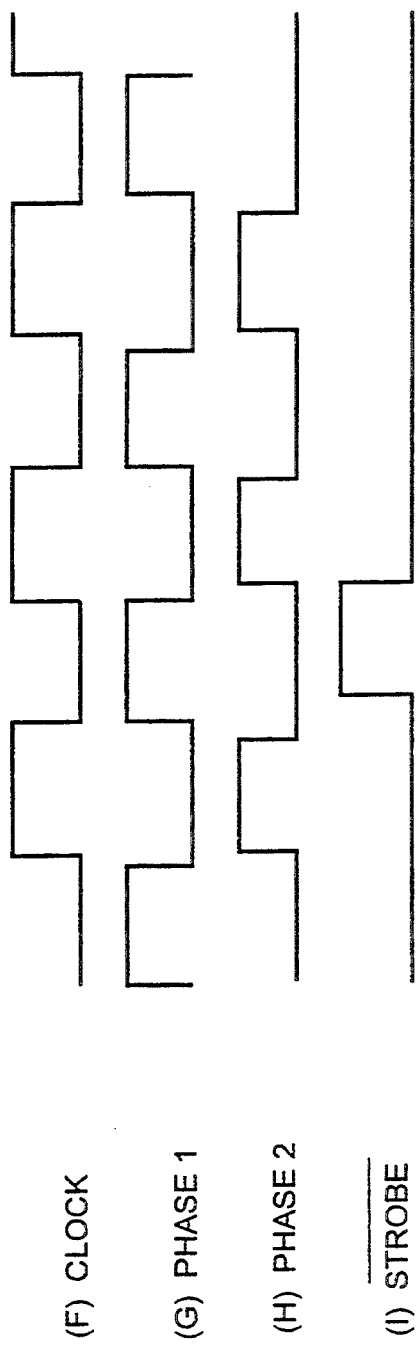
FIG. 5
(F) CLOCK
(G) PHASE 1
(H) PHASE 2
(I) $\overline{\text{STROBE}}$

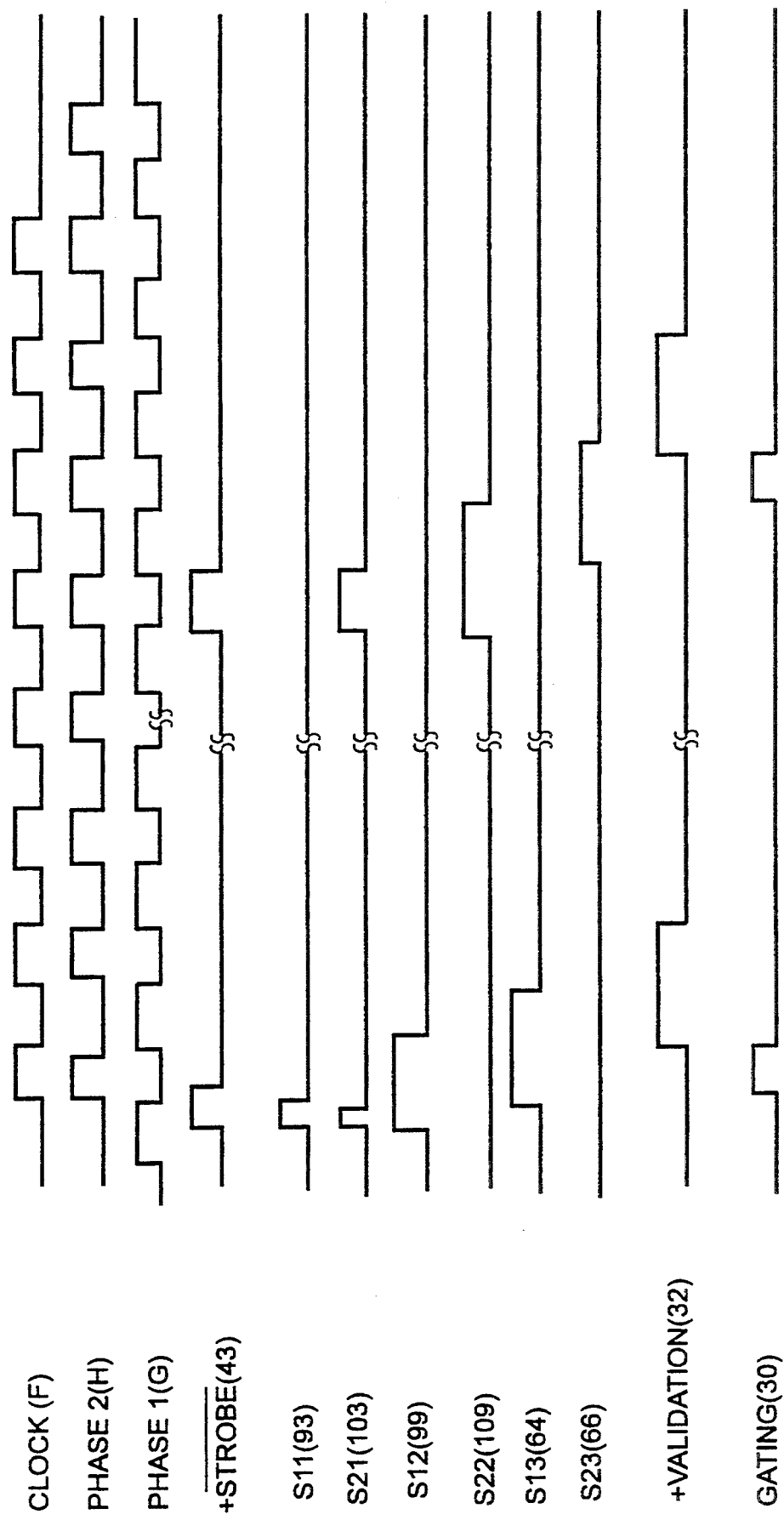

SYNCHRONIZATION APPARATUS FOR A SYNCHRONOUS DATA PROCESSING SYSTEM

FIELD OF THE INVENTION

The subject invention relates to a synchronization apparatus, to be used in a synchronous data processing system having a plurality of units linked by busses wherein data are transferred between the units and processed by the receiving units under control of a clock signal which is distributed to each unit.

BACKGROUND ART

In a data processing system, it is common practice to interconnect several data processing units by a common bus so that they can exchange data. The bus accesses are managed by an arbitrating device which receives the access requests to the bus from the units and grants the use of the bus to a selected unit.

In synchronous data processing systems, the transmission of data bits from a source unit to a target unit, as well as the reception of data bits by the target unit and the processing of data within the units, is controlled by a clock signal which is distributed to each unit from a central clock device.

Up to now, in such synchronous systems there was no need for synchronization circuits, since each unit operated under control of the same clock signal. But as the frequency of the clock signal is increased to improve the performance of the system, the transmission delay of the data bits between two units versus the clock signal period cannot be neglected.

For example, if the units are made with logic circuitry implemented in CMOS technology, the transmission delays are equal to about 35 nanoseconds which cannot be neglected when the period of the clock signal is 40 nanoseconds.

Generally, the problem which results from the transmission delay is solved by adding to the bus lines normally used for exchanging the data at least one clock line, for transmitting a synchronization clock signal (also called STROBE signal) which is used by the receiving unit to sample the received data.

Using this synchronization clock which accompanies the data signal solves the problem which results from the transmission delay of the data bits on the bus linking the units, nevertheless the data bits sampled by the receiving unit are not in phase with the internal clock signal received by the unit from the central clock device.

U.S. Pat. No. 4,611,279 describes a circuit to be used in an asynchronous microcomputer system wherein the direct memory access controller of the memory is not synchronized to the clock signal of the microprocessor. Instead of changing the clock signal of the microprocessor to accommodate the worst case conditions of the memory accesses, the clock of the direct memory access controller is only changed when the worst case conditions occur, thus to prevent data loss. This circuit does not solve the problem of resynchronizing the received data bits with a clock signal in a synchronous data processing system.

OBJECTS OF THE INVENTION

An object of the present invention is to provide a synchronization apparatus, implemented in a synchronous communication system wherein bits are transferred between source and target units, for resynchronizing the data bits received by the target unit with the unit's internal clock signal.

Another object of the present invention is to provide such a synchronization apparatus which operates properly whatever is the position and width of the synchronization pulse, accompanying the data bits and used to sample data bits received by the target unit, within the period of the internal clock signal.

BRIEF SUMMARY OF THE INVENTION

The apparatus according to the present invention is implemented in a data communication system wherein bits are transferred between source and target units through a bus with associated synchronization pulses (strobe) transmitted on a synchronization line. The synchronization ]pulses received by the target user are used for sampling the received bits and the bits are processed under control of an internal clock signal of period T distributed to each unit of the system. The function of the apparatus is to resynchronize the sampled received bits with the internal clock signal of the target unit. It comprises:

- a first register wherein the bits received from the bus are inputted under control of the associated synchronization pulses,
- at least one two-stage synchronization device wherein the first stage is responsive to a synchronization pulse occurring during the first half period of the internal clock signal and the second stage is responsive to a synchronization pulse occurring during the second half period for generating therefrom a gating pulse on a gating line during the second half of an internal clock period and setting a validation signal at an active state for the duration of the next internal clock period,
- a second register in which the bits stored in the first register means are transferred under control of the gating pulse to be processed under control of the internal clock signal by user data processing means when the validation signal is at the active level.

In a preferred embodiment of the present invention two synchronization devices are provided to alternatively process the synchronization pulses under control of a selection circuit which provides a synchronization pulse alternatively to the first and second synchronization device.

The synchronization device comprises:
- a non-overlapped clock generating circuit which is responsive to the internal clock signal for generating therefrom a first phase clock signal (PH1) which is at a first level (UP) during the first half of the internal clock period and a second phase clock signal which is at the first level during the second half of the internal clock period.

Each two-stage synchronization device comprises:
- a first stage including a first latch having a data input and a clock input to which the first phase clock signal is provided and which generates an output signal on a first output line which is set to the level of the signal on the data input when the level of the signal on the clock input is at the first level (UP), and first output logic circuits responsive to the signal on the first output line of the first latch, to the second phase clock signal and to the internal clock signal for generating the gating pulse and the validation signal when the synchronization signal occurs when the first phase clock signal is at the first level, a second stage including a second latch having a data input and a clock input to which the second phase clock signal is provided and which generates an output signal on a second output line which is set to the level of the signal on the data input when the level of the signal on the clock input is at the first level (UP), and second output logic circuits responsive to the signal on the second output line of the second latching means and to the first phase clock signal and to the internal clock signal for generating the gating pulse and the validation signal when the synchronization signal occurs when the second phase clock signal is at the first level, inhibiting means for interconnecting the first and second latches, in order to insure that only one stage generates the gating pulse and validation signal in response to the same synchronization pulse.

BRIEF DESCRIPTION OF THE DRAWINGS

FIG. 5 represents one of the synchronization device 41,42.

FIG. 6 represents a timing diagram illustrating the operation of the synchronization device.

DETAILED DESCRIPTION OF THE INVENTION

Figure 1:
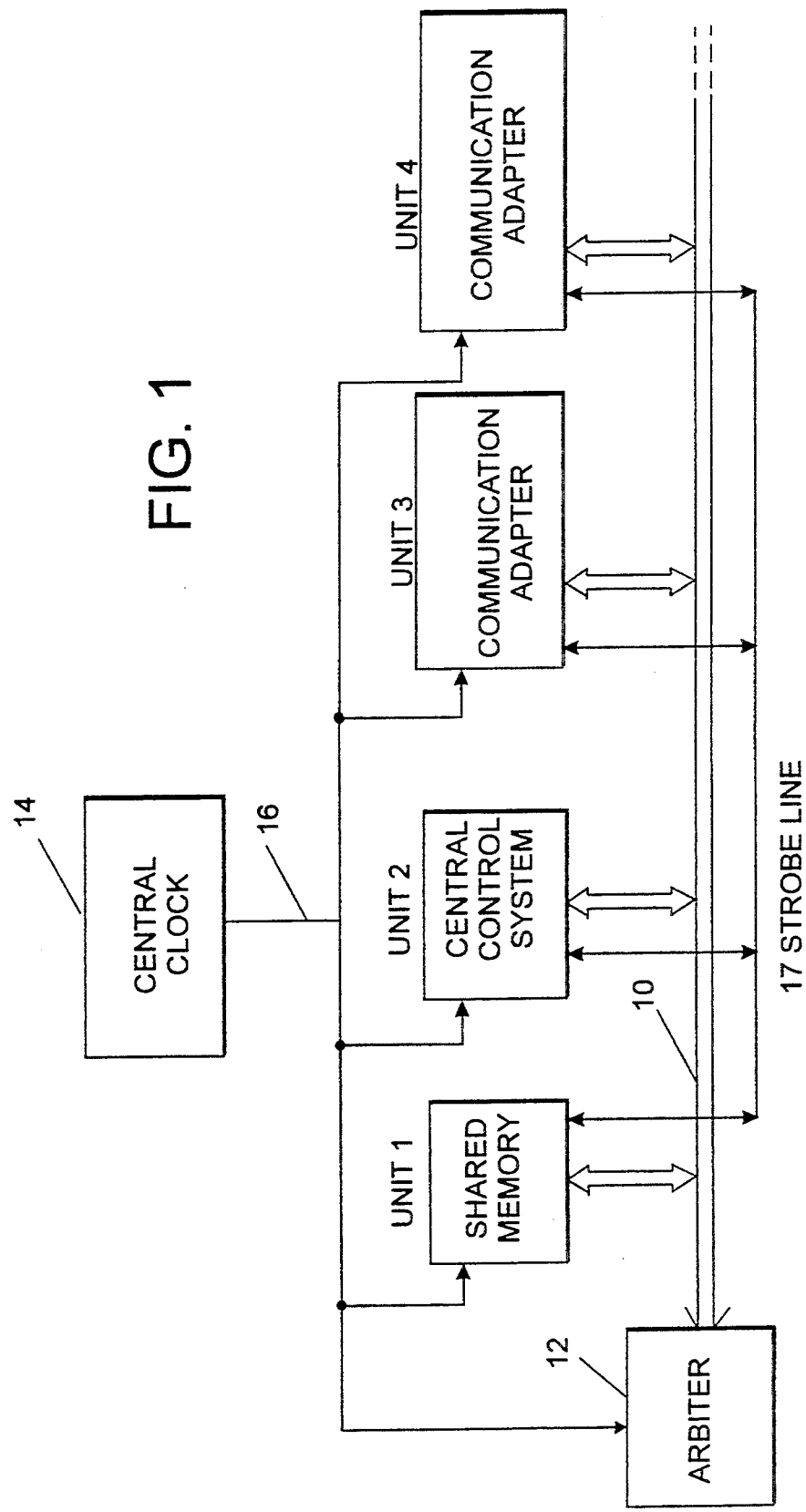
FIG. 1 represents a data processing system wherein the synchronization apparatus according to the present invention can be implemented.

FIG. 1 represents a data processing system which may incorporate the synchronization apparatus according to the present invention. This system comprises units shown as unit 1, 2, 3 and 4, interconnected by a bus 10. The access to the bus by a selected unit is controlled by an arbiter circuit 12. The bus 10 comprises a request line and a grant line per unit, each unit which makes an access request to the bus posts a request signal on its request line. The arbiter selects a unit based upon a selection algorithm and provides to the selected unit a grant signal on its grant line. A central clock device 14 generates a clock signal on line 16 which is distributed to each unit.

For example, such a system may be of the type described in FIG. 8 of European patent application 0365731. Unit 1 may be a shared memory, unit 2 may be a central control system and units 3 and 4 may be communication adapters which exchange messages through the shared memory under control of the central control system.

As described in the patent application, messages are exchanged between users connected to the communication adapters through the shared memory.

The bus comprises address, data and control lines as is usual which are used by the units to send information to another unit.

In this system, each unit can be a source unit and a target unit. This means that any unit may send a request to a target unit through the bus, said request contains information identifying the type of operation to be performed by the target unit. The target unit receives the request and sends an acknowledgement to the source unit. Then, it processes the request and, when necessary depending upon the type of operation, it becomes a source unit for sending a response to a unit.

Figure 2:
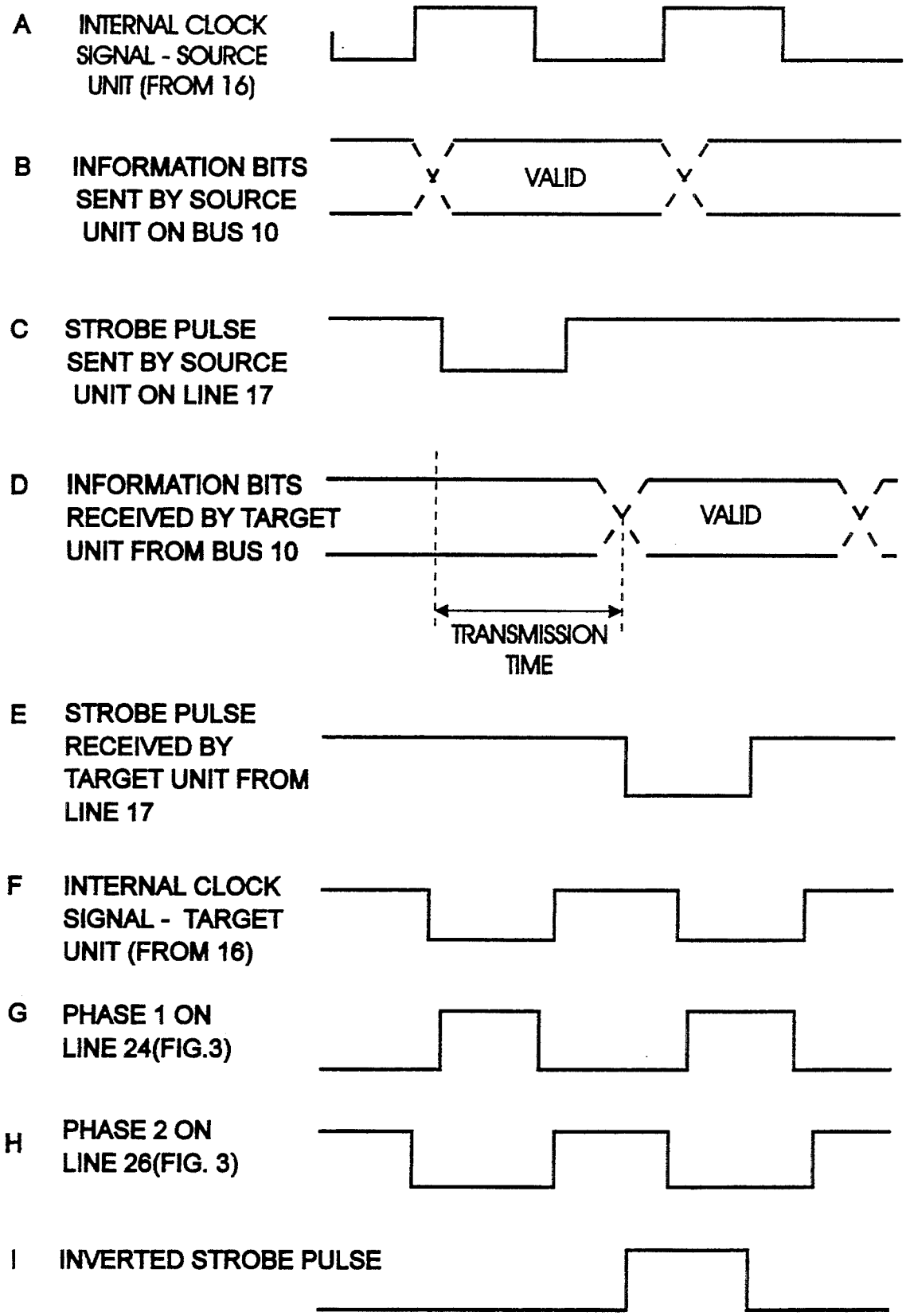
FIG. 2 represents a timing diagram illustrating the problem solved by the present invention.

As shown in FIG. 2, the information bits are sent by the source unit on the bus 10 on the leading edge of the clock signal provided to the unit by the general clock device on line 16 as shown by A in FIG. 2. These bits are valid on the bus 10 during one clock period as shown by B. The strobe pulse shown by C is sent by the source unit on bidirectional companion clock line 17 when the source unit is selected by the arbiter. This strobe pulse is made of one inverted clock pulse which is transmitted on line 17 with the information bits on bus 10. It is used by the target unit to sample the received information bits.

D represents the information bits received by the target unit from bus 10 and E represents the strobe pulse received by the unit. Since the transmission delays of the information bits and strobe pulse are identical, the received information bits which are sampled by the target unit at the leading edge of the received strobe pulse are valid.

However, these information bits may not be in phase with the internal clock signal provided from the central clock device to the target receiving unit, as shown by F.

The synchronization circuit according to the subject invention, allows resynchronization of the received data bits with the internal clock signal of the receiving unit, whatever the position and width of the received strobe pulse E are with respect to the internal clock signal of the receiving unit.

Figure 3:
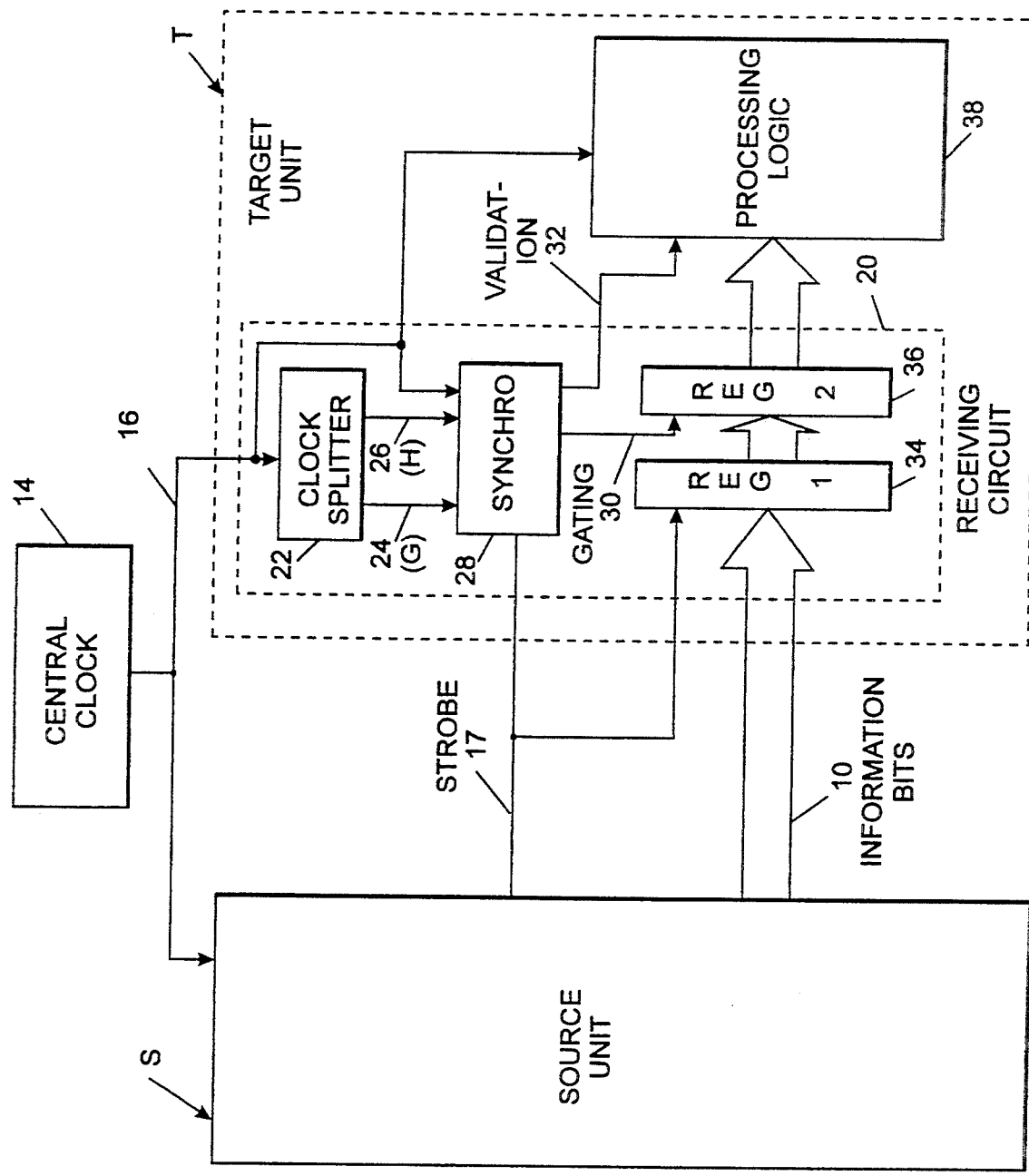
FIG. 3 represents the synchronization apparatus according to the present invention.

FIG. 3 schematically represents one source unit S selected among units 1 to 4 to have access to the bus 10 so as to be able to provide address, control and data bits through bus 10 to a target unit T.

According to the subject invention, each unit comprises receiving circuit 20, used for resynchronizing the received data bits on bus 10 with its internal clock signal received from line 16. In FIG. 3, only the receiving circuit in target unit T is shown, but it should be understood that every unit, inasmuch as it may be a target unit, includes such a receiving circuit which comprises the synchronization apparatus according to the subject invention.

The synchronization apparatus comprises a clock splitter circuit 22 which generates from the clock signal received from line 16, two, non-overlapped clock signals, on lines 24 and 26, as shown by G and H in FIG. 2. A clock splitter circuit may be easily designed by delaying the clock signal and providing the delayed clock signal and the original clock signal to an appropriate logic circuit so as to obtain the signals G and H shown in FIG. 2.

The non-overlapped clock signals from lines 24 and 26 and the internal clock signal from line 16 are provided to a synchronization device 28 (which will be described in detail in reference to FIG. 4). The synchronization device 28 provides a gating signal on line 30 and a validation signal on line 32.

The bits received from bus 10 are provided to a first register 34. This register may be made of a number of D-latches equal to the number of lines of bus 10. Each line of the bus is connected to the D-input of a corresponding D latch. The clock input (C-input) of the D latch is connected to the strobe line 17, so that the Q-outputs of the latches of register 34 are set to the statuses of the bits on their D-inputs on the leading edge of the strobe pulse.

The Q-outputs of the D-latches of first register 34 are connected to the D-inputs of D-latches of a second register 36, the clock input of which is connected to the gating line 30 from synchronization arrangement 28 so that the Q-outputs of the latches of register 36 assume the statuses of the bits from bus 10, whatever the width and position of the strobe pulse are with respect to the internal clock signal on line 16. In addition, synchronization circuit 28 generates a validation signal on line 32 which is provided to the logic circuits 38 in charge of processing the received bits. This is so that the logic circuits process the bits in register 36 when this signal is activated to allow processing to be fully in synchronism with the internal clock signal from line 16.

The operation of the synchronization device will be described in reference to FIGS. 4 and 5.

Figure 4:
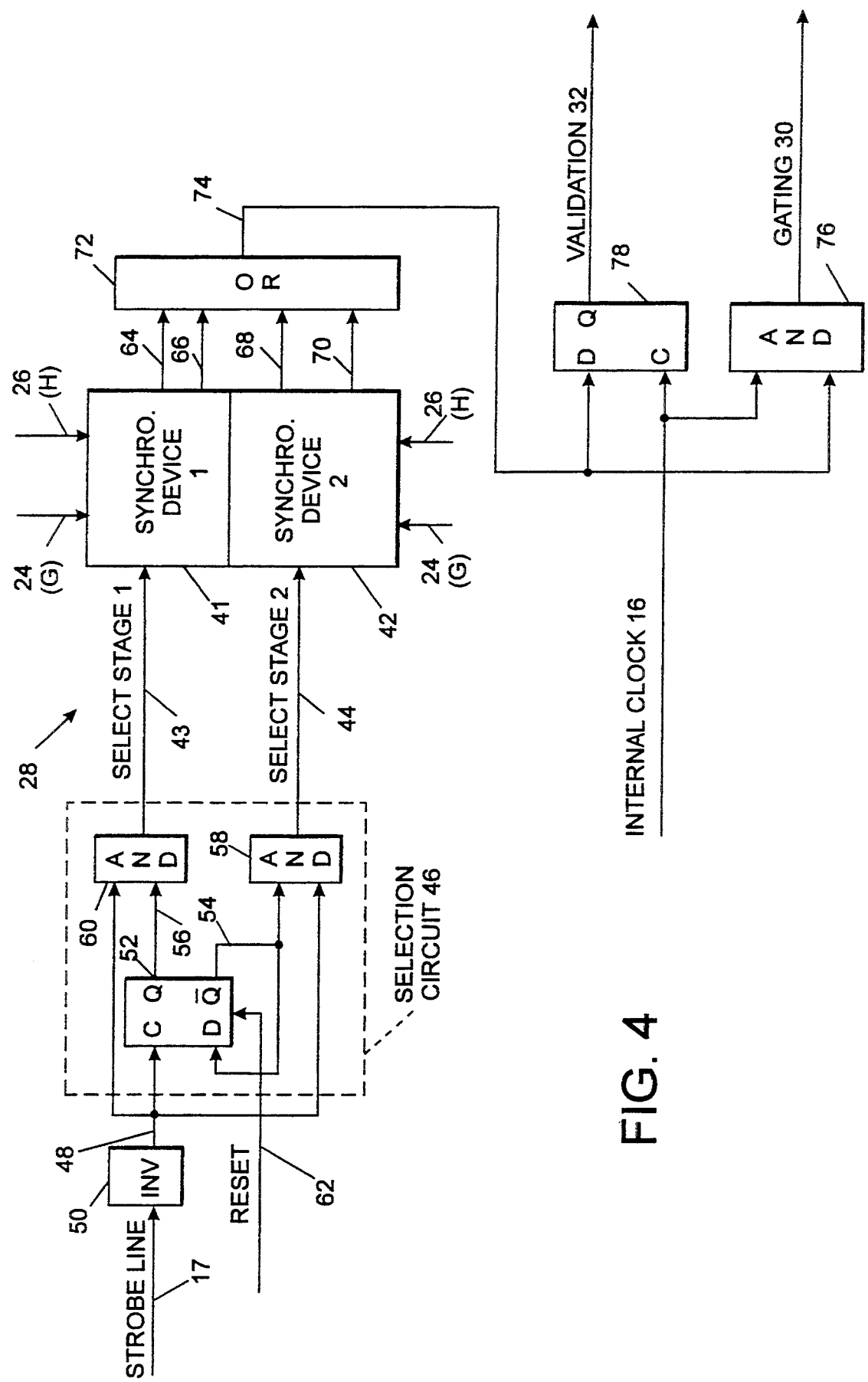
FIG. 4 represents the overall synchronization logic circuit 28 of FIG. 3.

In the preferred embodiment of the present invention, the synchronization arrangement comprises two identical synchronization devices, "Device 1 and Device 2" in FIG. 4, numbered 41 and 42, which are alternatively selected by the successively received strobe pulses by selection signals generated on Select Stage 1 and Select Stage 2, lines 44 and 46.

The provision of two synchronization devices allows the synchronization operation of the received data bits with the internal clock signal to be performed at each cycle of the internal clock whatever the width and position of the successively received strobe pulses are with respect to the internal clock signal.

The selection circuit 46 is responsive to the inverted strobe signal on the output line 48 of inverter 50, and shown by I in FIG. 2.

It comprises a D-latch 52 and AND gates 58 and 60. The clock input of the D-latch is connected to the inverted strobe line 48 and its D-input is connected to the $\overline{Q}$ output line 54.

$\overline{Q}$ and Q lines 54 and 56 are respectively connected to one input of AND gates 58 and 60. The other input of AND gates 58 and 60 is connected to line 48, which is the output line of inverter 50.

Select Stage 1 or Select Stage 2 signals are generated on either line 43 or 44 depending upon the status of the D-latch 52.

Initially, D-latch 52 is reset through a reset signal on line 62 so that its $\overline{Q}$ output line is at a "1" level.

The $\overline{Q}$ line remains at that level until the first inverted strobe pulse is received. At the leading edge of the pulse on clock input C of D-latch, the Q output line is set to a UP level and the $\overline{Q}$ output line is set to a DOWN level, so that the first inverted strobe pulse is provided on output line 43 of AND gate 60 to be processed by the first synchronization device 41. The $\overline{Q}$ output signal is set at DOWN level and at the leading edge of the next inverted strobe pulse, the Q output line 56 is set to the level of the D-input, i.e. DOWN level, the $\overline{Q}$ output is thus set to 1 and the inverted strobe pulse is provided on Select Stage 2 line 44 to be processed by second synchronization device 42.

Each device 41 and 42 has two output lines 64,66 and 68,70, respectively, which are provided to OR circuit 72.

OR circuit 72 provides an enlarged strobe pulse having the duration of an internal clock period irrespective of the position and width of the strobe pulse.

Line 74 is provided to the input of AND gate 76 which receives on its second input the internal clock signal to generate on its output line 30, the gating signal provided to register 36, (FIG. 2).

The output line 74 is also provided to the input of a D-latch 78, the clock input of which is provided to the internal clock line 16.

Latch 78 generates the validation signal on line 32 in perfect synchronism with the internal clock signal.

Each synchronization device 41, 42 is made of two latching arrangements.

Only one device, for example device 41, is shown in FIG. 5. It comprises latching arrangements 80 and 82. Arrangement 80 captures an inverted strobe pulse from line 43 occurring during the high level pulses of phase 1 signal G on line 24 and regenerates a strobe pulse having an increased duration on its output line 64.

Arrangement 82 captures an inverted strobe pulse from line 43 occurring during the high level pulses of phase 2 signal H on line 26 and regenerates a strobe pulse having an increased duration on its output line 66. Output lines 64 and 66 are provided to the inputs of OR circuits 72.

Circuits 80 and 82 are, interconnected in order to solve the metastability problems which occur when an inverted strobe pulse occurs at the end of a high level pulse of either the phase 1 or phase 2 signal.

Circuit 80 comprises AND gates 90, 92, OR gate 94, and D-latches 96 and 98. Similarly circuit 82 comprises AND gates 100, 102, OR gate 104, and D-latches 106 and 108 interconnected in the same way as corresponding components in circuit 80.

The inverted strobe pulse from line 43 is provided to one input of OR gates 94 and 104, the other inputs of which are the output lines 91 and 101, respectively, of AND gates 90 and 100. The inputs to AND gates 92 and 102 are the output lines 95 and 105 of OR gates 94 and 104 and the $\overline{Q}$ output lines 97 and 107 of D-latches 96 and 106.

The output lines 93 and 103 of AND gates 92 and 102 are provided to the D-inputs of latches 96 and 106. These latches have their clock inputs C connected to lines 24 and 26, respectively, and provide on their Q-output lines 99 and 109 a signal which has the level of the signal on the D-input when the clock signal on C-input is at an UP level.

Q-output lines 99 and 109 of latches 96 and 106 are provided on the D-inputs of latches 98 and 108, the clock input of which is connected to lines 26 and 24 respectively. The Q-output lines of latches 98 and 108 are set to the level of the signal on the D-input at the leading edge of the clock signal on the clock input.

One of the inputs to AND gates 90 and 100 are the $\overline{Q}$ output lines 110 and 112 of latches 98 and 108. The other inputs to these AND gates are the Q-output lines 99 and 109 of latches 96 and 106.

Initially all latches are reset, so that they provide an UP level signal on their $\overline{Q}$ output lines.

Thus, latching arrangements 80 and 82 are in condition to process an inverted strobe pulse.

If the inverted strobe occurs when the phase 1 signal is at an UP level, it will be processed by arrangement 80. As long as the phase 1 signal is at an UP level, the strobe pulse is reproduced at the Q output 99 of latch 96 even if the strobe pulse disappears. This results from the fact that latch 96 provides an UP level signal at the input of AND gate 90, which also receives an UP level signal on its other input, since latch 98 is reset.

Thus, an UP level signal is provided to the D-input of latch 96 until the leading edge of the phase 2 signal. At that time, the level on the Q-output line 64 of latch 98 is set to an UP level and remains at this level for one clock period.

Circuit 82 processes in the same way an inverted strobe pulse which arises when the phase 2 signal is at an UP level.

The interconnection between latches 96 and 106 though AND gates 92 and 102 insures that only one circuit 80 or 82 is able to process the inverted strobe pulse. As a consequence, if a strobe pulse occurs at the transition period of phase 1 and phase 2 signals, it will be captured by the first latch 96 or 106 which will be able to provide a stable Q-output signal at an UP level.

FIG. 6 represents the signals on lines 93 and 103, 99 and 109, 64 and 66 and the resulting validation signal on line 32 depending upon the position of the strobe pulse on line 43.

According to the present invention, the synchronization of the received strobe pulse is made in parallel with the data sampling. It is made as fast as possible. A very narrow strobe pulse may be detected, using a minimum number of logic cells.

We claim:

1. In a data communication system wherein bits are transferred between a source and a target unit through a bus (10) with associated synchronization pulses (strobe) transmitted by the source unit on synchronization line (17), the synchronization pulses received by the target unit being used for sampling the received bits and wherein the bits are processed under control of an internal clock signal of period T distributed to each unit of the system, an apparatus for resynchronizing the sampled received bits with the internal clock signal of the target unit, characterized in that it comprises in each unit:

first storing means (34) wherein the bits received from the bus are inputted under control of the associated synchronization pulses, non-overlapped clock generating means (22) which is responsive to the internal clock signal for generating therefrom a first phase clock signal (PH1) which is at a first level (UP) during a first half of the internal clock period and a second phase clock signal (PH2) which is at the first level during a second half of the internal clock period.

at least one synchronization means (28) responsive to the first and second phase clock signals and synchronization pulses for generating therefrom a gating pulse on a gating line (30) during the second half of an internal clock period and setting a validation signal on a validation line (32) at an active state for the duration of the next internal clock period, second storing means (36) for storing the bits received from the first storing means under control of the gating pulse, said bits stored in second storing means being processed by unit data processing means (38) under control of the internal clock signal when the validation signal is at the active level.

2. The synchronization apparatus according to claim 1 characterized in that it comprises a first and a second synchronization means (41, 42), and a selection means (46) which provides a synchronization pulse alternatively to the first and second synchronization means.

3. The synchronization apparatus according to claim 1 or 2, characterized in that each synchronization means comprises, a first stage comprising a first latching means (96) having a data input (93) and a clock input (24) to which the first phase clock signal is provided and generating an output signal on a first output line (99) which is set to the level of the signal on the data input of the first latching means when the level of the signal on the clock input of the first latching means is at the first level and first output means (98,72,78,76) responsive to the signal on the first output line of the first latching means and to the second phase clock signal and to the internal clock signal for generating the gating pulse and the validation signal when the synchronization signal occurs when the first phase clock signal is at the first level, a second stage comprising a second latching means (106) having a data input (103) and a clock input (26) to which the second phase clock signal is provided and generating an output signal on a first output line (109) which is set to the level of the signal on the data input of the second latching means when the level of the signal on the clock input of the second latching means is at the first level and second output means (108,72,78,76) responsive to the signal on the first output line of the second latching means and to the first phase clock signal and to the internal clock signal for generating the gating pulse and the validation signal when the synchronization signal occurs when the second phase clock signal is at the first level, inhibiting means (92,107,102,97) for interconnecting the first and second latching means, in order to insure that only one of said first and second latching means is responsive to the same synchronization pulse.

4. The synchronization apparatus according to claim 3, characterized in that:

the first output means comprises a third latching means (98) having a data input connected to the first output line of the first latching means and the second clock input (26) to which the second phase clock signal is provided, said third latching means providing a signal at the first level on a first output line (64) at the leading edge of the pulse of the second phase clock signal, the second output means comprises a third latching means (108) having a data input connected to the first output line of the first latching means and the first clock input (24) to which the first phase clock is provided, said fourth latching means providing a signal at the first level on a first output line 66 at the leading edge of the pulse of the first phase clock signal.

5. The synchronization circuit according to claim 4 characterized in that the first and second output means comprises:

an OR circuit means (72) having inputs connected to the first output lines (64,66) of said third and fourth latching means.

a fifth latching means (78) having a data input (74) connected to the output of the OR circuit means and a third clock input (16) to which the internal clock signal is provided, said fifth latching means providing the validation signal on the validation line (32), and an AND circuit means (76) having inputs connected to the output of the OR circuit means and to the internal clock signal and providing the gating pulses on the gating line (30).

6. The synchronization circuit according to claim 4, characterized in that the first latching means comprises first synchronization pulse input means (90,94,92) for receiving the synchronization pulse and gating said synchronization pulse to the data input of the first latching means when it occurs when the first phase clock signal is at the first level, said first synchronization pulse input means being also responsive to the signal on the first output line of the first latching means and to an inverted output signal on a second output line of the third latching means to maintain the data input of the first latching means at the first level until the second phase clock signal is set to the first level even if the strobe pulse disappears.

7. The synchronization circuit according to claim 6, characterized in that the second latching means comprises second synchronization pulse input means (100, 104, 102) for receiving the synchronization pulse and gating said synchronization pulse to the data input of the second latching means when it occurs when the second phase clock signal is at the first level, said second synchronization pulse input means being also responsive to the signal on the first output line of the second latching means and to an inverted output signal on a second output line of the fourth latching means to maintain the data input of the second latching means at the first level until the first phase clock signal is set to the first level even if the strobe pulse disappears.

* * * * *